Aug. 23, 1932.  A. H. OELKERS  1,872,798
TRUCK
Filed May 18, 1929   2 Sheets-Sheet 1
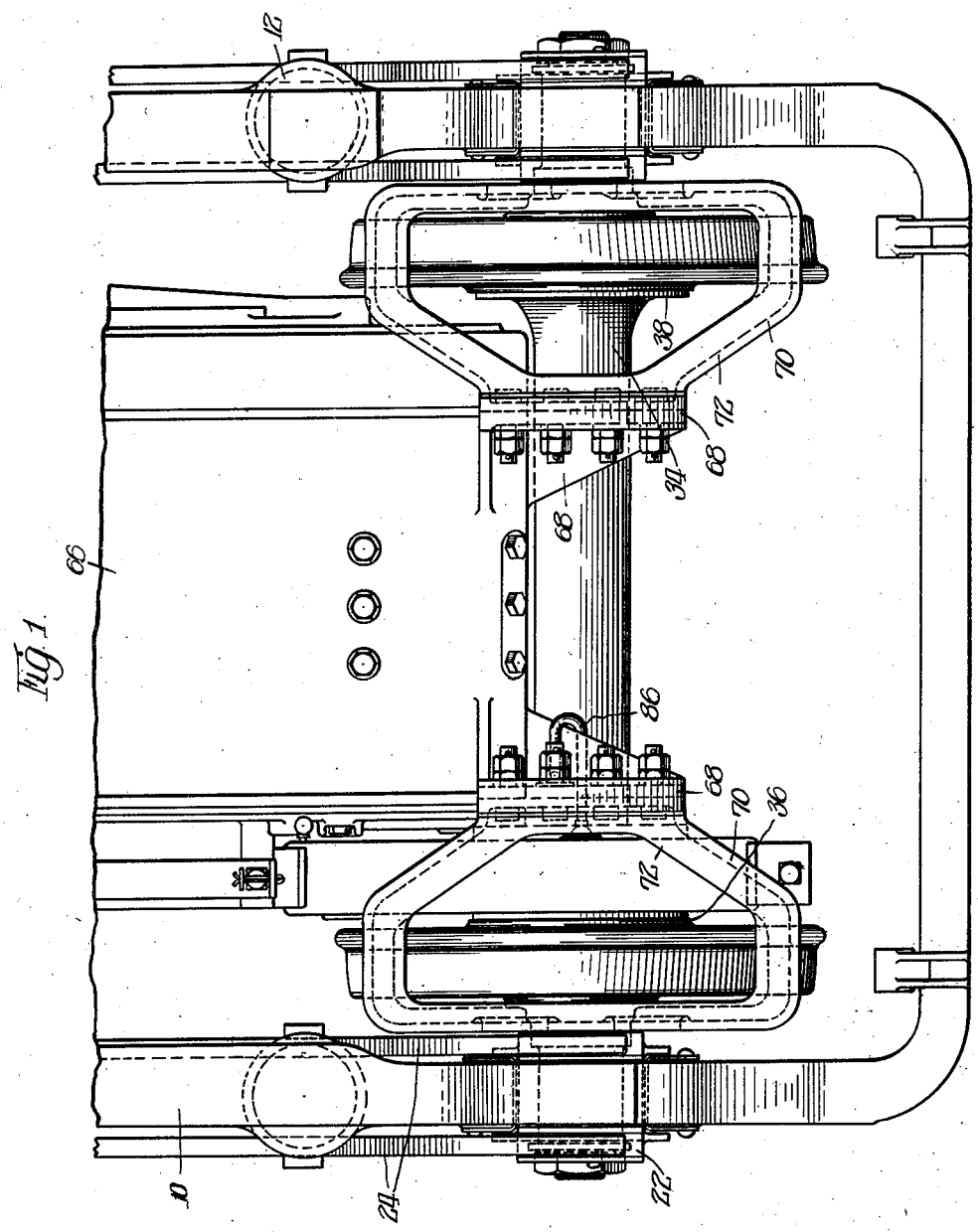
Inventor:
Alfred H. Oelkers,
By Wilkinson, Huxley, Byron & Knight
Attys.

Aug. 23, 1932.  A. H. OELKERS  1,872,798
TRUCK
Filed May 18, 1929   2 Sheets-Sheet 2
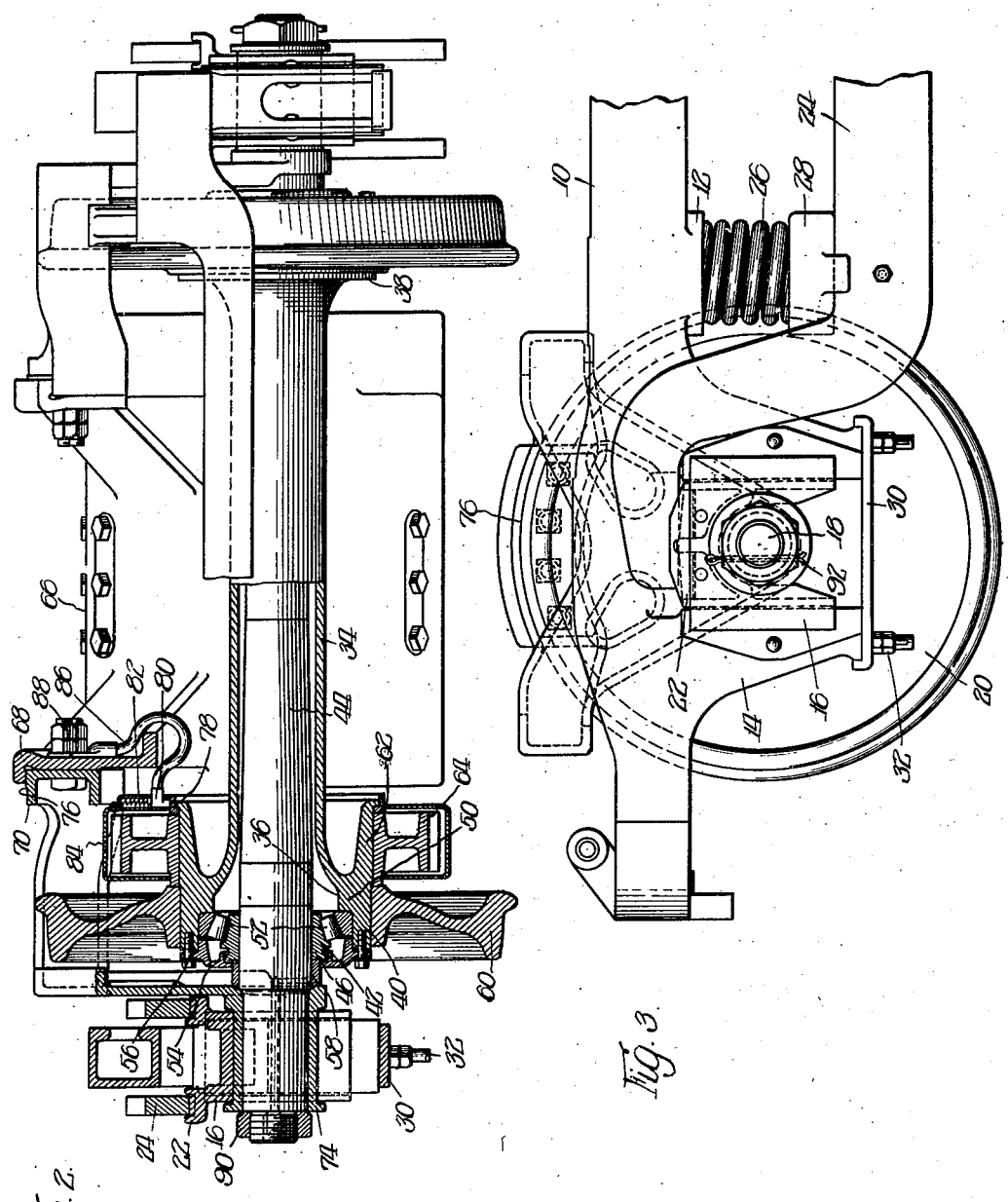
Inventor:
Alfred H. Oelkers,
By Wilkinson, Huxley, Byron & Knight
Attys.

Patented Aug. 23, 1932

1,872,798

UNITED STATES PATENT OFFICE

ALFRED H. OELKERS, OF CHICAGO, ILLINOIS, ASSIGNOR TO AMERICAN STEEL FOUNDRIES, OF CHICAGO, ILLINOIS, A CORPORATION OF NEW JERSEY

TRUCK

Application filed May 18, 1929. Serial No. 364,024.

This invention pertains to roller bearing motor trucks for railway cars, and more particularly to drive mechanism mounting on self-propelled vehicles utilizing anti-friction type of roller bearing wheel and axle assemblies.

With the present day construction propelling driving wheels of electric motor trucks on cars and locomotives, it is the practice to provide a pair of wheels pressed on an axle having a journal at each end revolving in a bearing within a journal box and having a gear element pressed on the axle between the wheels, which gear element receives the drive from the motor. The axle is provided with two bearings between the wheels on which one end of the motor is mounted, and in such case, said bearings engage the axle to keep the driving gear and motor pinion in proper mesh. The bearings in the journal boxes while on the same axle, perform only the function of carrying the weight of the car. The tendency of present practice is to equip vehicles with roller bearing assemblies, with the object of reducing the power necessary for starting and stopping long trains as well as to provide parts which are longer lived due to frictional reduction. Not only is it advisable to apply these roller bearing assemblies to trailing vehicles, but it is highly desirable to use them directly on self-propelled vehicles whether driven by electricity, oil or steam.

With the development of the roller bearing assembles, and especially those including a pair of wheels mounted rigidly on an axle housing which in turn revolves on roller bearings about a fixed axle, a new construction for carrying the motor and keeping it in proper mesh with the driving gear has been developed. In this type of roller bearing wheel and axle assembly, the inner axle is normally stationary and is at all times held in true alignment with the wheels because the roller bearings are mounted rigidly and hold the axle concentrically with the wheels at all times. It is therefore practical to support the motor by members fastened to the axle around which the wheels revolve, that is, the fixed axle, which will thereby keep the pinion of the motor in proper mesh with the driving gear without employing the friction bearings now used on revoluble axles, thereby eliminating bearings or friction surfaces.

It is therefore an object of this invention to provide means for effectively transmitting torque and imparting tractive effort to rotate driving wheels and anti-friction bearings of railway car trucks.

Another object is to provide a wheel and axle assembly for motor driven trucks which provides for the emergency of auxiliary rotation in the truck journals if the roller bearings of the driving axle should fail.

Still another object is to provide supporting means for a prime mover of any type, such as an electric motor, turbine, booster motor or the like, to a railway wheel and axle assembly by means of anti-friction bearings in such a manner that a plurality of roller bearing assemblies, one placed approximately in each wheel cup, perform the function of carrying the weight imposed upon the truck and in holding the motor in position for proper functioning of the geared or other similar draft.

A further object is to provide a support for a prime mover for driving the wheels of a friction assembly, which support is held in operative position with respect to the wheel and axle assemblies by means of bearings which are subjected to substantially no wear.

Yet further object is to provide a support for a prime mover for an anti-friction wheel and axle assembly which while associated in operative relation with respect to said wheel and axle assembly, is yet supported with respect thereto in such a manner as to eliminate the use of frictional bearings for supporting the prime mover with respect to the driving wheels.

Still further object is to provide a truck construction utilizing anti-friction wheel and axle assemblies in conjunction with a driving motor, which motor is mounted rigidly on the axle on which the wheels revolve, the truck structure being such as to permit the truck frame and bolster to shift and vibrate in various positions without affecting the relative positions for the driving wheels and gear through which the wheels are driven by the motor.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a fragmentary top plan view of a portion of a railway truck driven by an electric motor, showing the support between the motor and the fixed axle of a wheel and axle assembly;

Figure 2 is an end elevation, partly in section, of the truck structure shown in Figure 1, the section being taken substantially through the center of the axle on the driven end; and Figure 3 is a fragmentary side elevation of the truck structure embodying the invention.

In the truck structure shown, the side frames 10 are provided with the spring seats 12 and with depending spaced jaws 14 for accommodating a bearer 16 for the inner axle 18 of the anti-friction wheel and axle assemblies 20. The bearer 16 is provided with seats 22 adapted to support the ends of equalizers 24, a spring 26 being disposed between the spring seat 12 and the spring seat 28 cooperating with equalizers 24 for resiliently positioning said equalizers and frame with respect to each other. A strap 30 is secured by suitable means, such as the bolts 32, to the lower ends of the jaws 14 to limit the vertical movement between the bearer 16 and the truck frame.

The wheel and axle assemblies 20 consist essentially of an outer rotary axle 34 having enlarged end portions 36 and 38 providing lubricant recesses 40 in which the anti-friction bearings 42 are mounted. An inner normally stationary axle 44 is disposed through the outer axle 34, and the inner race ring 46 of the roller bearing assembly is mounted thereon as by a pressed fit in each recess. An outer race ring 48 of the roller bearing assembly is mounted as by a pressed fit in each end of the lubricant recess and limited by the stop 50 provided by the axle 34, rollers 52 being mounted in suitable cages between the race rings, the lubricant recesses being closed by means of the cover 54 secured to the outer axle as by the bolts 56 and extending to a point adjacent the collar 58 shrunk or press fitted to the inner axle for securing the inner race ring 46 in operative position. Wheels 60 are mounted on the outer axle in such a manner as to revolve therewith, and as shown, the outer axle is provided with an enlarged portion 62 upon which the gear element 64 is rigidly mounted for transmitting power to revolve the wheels 60.

The electric motor 66, of the usual type used for driving electric rail cars or the like, is provided with a pair of arms 68 by which one end of the motor is supported on the brackets 70 which extend from the motor housing over and outside of the wheel and engage the normally stationary axle at the outer ends. The brackets 70 are preferably formed with a pair of arms 72 disposed on either side of the axis of the wheel and axle assembly in plan and are provided at their outer ends with a bore 74 which is slipped over the round end of the axle 44. The motor arms 70 are provided with the machined radial surface 76 which is concentric with the bore 74 at the outer end of the supporting arm 72. The brackets 68 are also provided with a machined radial surface which is concentric with the bore 74 in such a manner that the center of the cylindrically machined surface 76 on the motor arms is the proper gear pitch distance from the rotor of the motor so that the gear 64 being concentric around the inner axle 44 and the motor supported by the cylindrical surfaces of the bore 74 and the surface 76, the pinion of the motor will remain in true running pitch with respect to the gear 64, and this concentric running condition will not change as long as the roller bearings function properly.

A conductor ring 78 is pressed into the portion 62 of the axle housing or outer axle 34 and the brush 80 is spring pressed thereagainst by means of the spring 82 located in the housing 84, the brush 80 being the means by which the electric current flowing from the rail is conveyed through the coupler 86 to the motor supporting arm at the point 88. This electrical conductor is provided as a ground conduit for the motor housing to the rail independently of the contact through the roller bearings, thereby preventing arcing of heavy electrical currents through the small contacts of the rollers on the inner and outer race rings of the roller bearing assembly. The outer ends of the inner axle 44 may be provided with a nut 90, the removal of which facilitates the assembling or disassembling of the motor supporting arms 72, the end being locked in position by any means, such as the cotter 92.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a truck, the combination of a wheel and axle assembly including an outer rotary axle provided with bearing receiving portions and wheel receiving portions, wheels mounted on said last named portions for rotation with said axle, a drive gear mounted on said axle adjacent one of said wheels and adapted to rotate therewith, an inner axle extending through said rotary axle, bearings disposed between said axles, truck members, truck bearers carried by the ends of said inner axle and cooperating with said truck members, bracket members carried by and secured to said inner axle and extending inwardly of said wheels to form motor mountings, and a motor secured to said mountings and having a drive gear meshing with said first named gear for imparting rotation of said wheels.

2. In a truck, the combination of a wheel and axle assembly including an outer rotary axle provided with bearing receiving portions and wheel receiving portions, wheels mounted on said last named portions for rotation with said axle, a drive gear mounted on said axle adjacent one of said wheels and adapted to rotate therewith, an inner axle extending through said rotary axle, bearings disposed between said axles, truck members, truck bearers carried by the ends of said inner axle and cooperating with said truck members, bracket members carried by and secured to said inner axle and extending inwardly of said wheels to form motor mountings, said bracket members each including a plurality of spaced arms joined at their ends, and a motor secured to said mountings and having a drive gear meshing with said first named gear for imparting rotation to said wheels.

3. In a truck, the combination of a wheel and axle assembly including an outer rotary axle provided with bearing receiving portions and wheel receiving portions, wheels mounted on said last named portions for rotation with said axle, a drive gear mounted on said axle adjacent one of said wheels and adapted to rotate therewith, an inner axle extending through said rotary axle, bearings disposed between said axles, truck members, truck bearers carried by the ends of said inner axle and cooperating with said truck members, bracket members carried by and secured to said inner axle and extending inwardly of said wheels to form motor mountings, said bracket members each including a plurality of spaced arms joined at their ends, said mountings being concentric with said axles, and a motor secured to said mountings and having a drive gear meshing with said first named gear for imparting rotation to said wheels.

4. In a truck, the combination of a wheel and axle assembly including an outer rotary axle provided with bearing receiving portions and wheel receiving portions, wheels mounted on said last named portions for rotation with said axle, a drive gear mounted on said axle adjacent one of said wheels and adapted to rotate therewith, an inner axle extending through said rotary axle, bearings disposed between said axles, truck members, truck bearers carried by the ends of said inner axle and cooperating with said truck members, a motor carried by said axle assembly and having a drive gear meshing with said first named gear for imparting rotation to said wheels, and an electrical connection between said motor and axle assembly.

5. In a truck, the combination of a wheel and axle assembly including an outer rotary axle provided with bearing receiving portions and wheel receiving portions, wheels mounted on said last named portions for rotation with said axle, a drive gear mounted on said axle adjacent one of said wheels and adapted to rotate therewith, an inner axle extending through said rotary axle, bearings disposed between said axles, truck members, truck bearers carried by the ends of said inner axle and cooperating with said truck members, bracket members carried by and secured to said inner axle and extending inwardly of said wheels to form motor mountings, said mountings being concentric with said axles, a motor secured to said mountings and having a drive gear meshing with said first named gear for imparting rotation to said wheels.

6. In a truck, the combination of a wheel and axle assembly including an outer rotary axle provided with bearing receiving portions and wheel receiving portions, wheels mounted on said last named portions for rotation with said axle, a drive gear mounted on said axle adjacent one of said wheels and adapted to rotate therewith, an inner axle extending through said rotary axle, bearings disposed between said axles, truck members, truck bearers carried by the ends of said inner axle and cooperating with said truck members, a motor carried by said axle assembly and having a drive gear meshing with said first named gear for imparting rotation to said wheels, a contact ring carried by said outer axle adjacent said first named gear, and an electrical connection between said gear ring and motor.

7. In a truck, the combination of a wheel and axle assembly including an outer rotary axle provided with bearing receiving portions and wheel receiving portions, wheels mounted on said last named portions for rotation with said axle, a drive gear mounted on said axle adjacent one of said wheels and adapted to rotate therewith, an inner axle extending through said rotary axle, bearings disposed between said axles, truck members, truck bearers carried by the ends of said inner axle and cooperating with said truck members, a motor carried by said axle assembly and having a drive gear meshing with said first named gear for imparting rotation to said wheels, a contact ring carried by said outer axle adjacent said first named gear, and an electrical connection between said gear ring and motor including a resiliently mounted brush contacting said contact ring.

8. In a truck, the combination of a wheel and axle assembly including an outer rotary axle provided with bearing receiving portions and wheel receiving portions, wheels mounted on said last named portions for rotation with said axle, a drive gear mounted on said axle adjacent one of said wheels and adapted to rotate therewith, an inner axle extending through said rotary axle, bearings disposed between said axles, truck members, truck bearers carried by the ends of said inner axle and cooperating with said truck members, bracket members carried by and secured to said inner axle and extending inwardly of said wheels to form motor mountings, a motor secured to said mountings and having a drive gear meshing with said first named gear for imparting rotation to said wheels, and an electrical connection between said motor and axle assembly.

9. In a truck, the combination of a wheel and axle assembly including an outer rotary axle provided with bearing receiving portions and wheel receiving portions, wheels mounted on said last named portions for rotation with said axle, a drive gear mounted on said axle adjacent one of said wheels and adapted to rotate therewith, an inner axle extending through said rotary axle, bearings disposed between said axles, truck members, truck bearers carried by the ends of said inner axle and cooperating with said truck members, bracket members carried by and secured to said inner axle and extending inwardly of said wheels to form motor mountings, said bracket members each including a plurality of spaced arms joined at their ends, a motor secured to said mountings and having a drive gear meshing with said first named gear for imparting rotation to said wheels, and an electrical connection between said motor and axle assembly.

10. In a truck, the combination of a wheel and axle assembly including an outer rotary axle provided with bearing receiving portions and wheel receiving portions, wheels mounted on said last named portions for rotation with said axle, a drive gear mounted on said axle adjacent one of said wheels and adapted to rotate therewith, an inner axle extending through said rotary axle, bearings disposed between said axles, truck members, truck bearers carried by the ends of said inner axle and cooperating with said truck members, bracket members carried by and secured to said inner axle and extending inwardly of said wheels to form motor mountings, said mountings being concentric with said axles, a motor secured to said mountings and having a drive gear meshing with said first named gear for imparting rotation to said wheels, and an electrical connection between said motor and axle assembly.

11. In a truck, the combination of a wheel and axle assembly including an outer rotary axle provided with bearing receiving portions and wheel receiving portions, wheels mounted on said last named portions for rotation with said axle, a drive gear mounted on said axle adjacent one of said wheels and adapted to rotate therewith, an inner axle extending through said rotary axle, bearings disposed between said axles, truck members, truck bearers carried by the ends of said inner axle and cooperating with said truck members, bracket members carried by and secured to said inner axle and extending inwardly of said wheels to form motor mountings, a motor secured to said mountings and having a drive gear meshing with said first named gear for imparting rotation to said wheels, a contact ring carried by said outer axle adjacent said first named gear, and an electrical connection between said gear ring and motor.

12. In a truck, the combination of a wheel and axle assembly including an outer rotary axle provided with bearing receiving portions and wheel receiving portions, wheels mounted on said last named portions for rotation with said axle, a drive gear mounted on said axle adjacent one of said wheels and adapted to rotate therewith, an inner axle extending through said rotary axle, bearings disposed between said axles, truck members, truck bearers carried by the ends of said inner axle and cooperating with said truck members, bracket members carried by and secured to said inner axle and extending inwardly of said wheels to form motor mountings, said bracket members each including a plurality of spaced arms joined at their ends, a motor secured to said mountings and having a drive gear meshing with said first named gear for imparting rotation to said wheels, a contact ring carried by said outer axle adjacent said first named gear, and an electrical connection between said gear ring and motor.

13. In a truck, the combination of a wheel and axle assembly including an outer rotary axle provided with bearing receiving portions and wheel receiving portions, wheels mounted on said last named portions for rotation with said axle, a drive gear mounted on said axle adjacent one of said wheels and adapted to rotate therewith, an inner axle extending through said rotary axle, bearings disposed between said axles, truck members, truck bearers carried by the ends of said inner axle and cooperating with said truck members, bracket members carried by and secured to said inner axle and extending inwardly of said wheels to form motor mountings, said mountings being concentric with said axles, a motor secured to said mountings and having a drive gear meshing with said first named gear for imparting rotation to said wheels, a contact ring carried by said outer axle adjacent said first named gear, and an electrical connection between said gear ring and motor.

14. A motor mounting for a wheel and axle assembly including spaced brackets having pairs of spaced arms, each of said pairs terminating in an axle engaging bearing.

15. A motor mounting for a wheel and axle assembly including a bracket having spaced arms terminating at one end in an axle engaging bearing and at the other end in motor securing bracket means, said bracket means having mounting portions concentric with said bearing.

16. A motor mounting for a wheel and axle assembly including a bracket having spaced arms adapted to be disposed inwardly of the wheel of said assembly, said arms terminating in an axle engaging bearing on the outside of said wheel.

17. A motor mounting for a wheel and axle assembly including a bracket having spaced arms adapted to be disposed inwardly of the wheel of said assembly, said arms terminating at one end in an axle engaging bearing and at the other end in motor securing bracket means, said bracket means having mounting portions concentric with said bearing.

18. A motor mounting including arms having a bearing member and a motor mounting bracket, said arms being spaced apart between said bearing member and bracket and converging to said bearing member and bracket.

19. A motor mounting having a bearing member and a spaced motor mounting bracket, said bracket being substantially concentrically curved with respect to said bearing member.

Signed at Chicago, Illinois, this 19th day of April, 1929.

ALFRED H. OELKERS.